(12) United States Patent
Grundvig (10) Patent No.: US 8,693,125 B1
(45) Date of Patent: Apr. 8, 2014

(54) CROSS CLOCK PHASE MEASUREMENT

(71) Applicant: LSI Corporation, San Jose, CA (US)

(72) Inventor: Jeffrey P. Grundvig, Loveland, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/743,411

(22) Filed: Jan. 17, 2013

(51) Int. Cl.
*G11B 5/09* (2006.01)

(52) U.S. Cl.
USPC .............................................. 360/51

(58) Field of Classification Search
None
See application file for complete search history.

(56) References Cited

U.S. PATENT DOCUMENTS

| | | | | |
|---|---|---|---|---|
| 5,153,784 A * | 10/1992 | Kitamura | | 360/60 |
| 5,295,130 A * | 3/1994 | Tobita et al. | | 369/124.15 |
| 5,388,090 A * | 2/1995 | Hoshino et al. | | 369/44.34 |
| 5,461,642 A * | 10/1995 | Hutchins et al. | | 375/327 |
| 5,572,502 A * | 11/1996 | Naruse et al. | | 369/116 |
| 5,586,098 A * | 12/1996 | Nishida et al. | | 369/116 |
| 5,689,479 A * | 11/1997 | Nomoto | | 369/13.14 |
| 5,802,027 A * | 9/1998 | Senshu | | 369/47.35 |
| 5,838,512 A * | 11/1998 | Okazaki | | 360/51 |
| 5,900,010 A * | 5/1999 | Aoki et al. | | 711/114 |
| 6,198,711 B1 * | 3/2001 | Fujita et al. | | 369/59.16 |
| 6,987,817 B1 * | 1/2006 | Reuveni | | 375/340 |
| 7,138,840 B2 * | 11/2006 | Serrano et al. | | 327/158 |
| 7,177,114 B1 * | 2/2007 | Bui et al. | | 360/77.12 |
| 2003/0147166 A1 * | 8/2003 | Hetzler et al. | | 360/51 |
| 2004/0252395 A1 * | 12/2004 | Elliott et al. | | 360/51 |
| 2005/0068866 A1 * | 3/2005 | Serrano et al. | | 369/47.28 |
| 2006/0023602 A1 * | 2/2006 | Rauschmayers | | 369/59.19 |
| 2013/0141812 A1 * | 6/2013 | Stein et al. | | 360/51 |

\* cited by examiner

*Primary Examiner* — Peter Vincent Agustin
(74) *Attorney, Agent, or Firm* — Advent, LLP (57) ABSTRACT

A clock phase measurement circuit comprises a selector circuit operable to inject one of a first analog clock signal or a second analog clock signal into a signal path configured to carry an analog data signal, so that the injected analog clock signal replaces the data signal. An Analog to Digital Converter (ADC) converts the injected analog clock signal to a digital clock signal. A counter selects a time, using the second analog clock signal, to determine at least one of a phase or a magnitude of the digital clock signal. A measurement circuit determines at least one of the phase or the magnitude of the digital clock signal for at least one frequency at the selected time.

20 Claims, 4 Drawing Sheets

CROSS CLOCK PHASE MEASUREMENT

FIELD OF THE INVENTION

The present disclosure relates to the field of electronic data access, and particularly, to systems and methods for performing cross clock phase and/or magnitude measurement.

BACKGROUND

In hard disk drives (HDDs), the read channel typically includes two Phase-Locked Loop (PLL) circuits that generate two synthesized clocks, where the frequency of one clock is programmed to match the user data frequency, while the frequency of the second clock is programmed to match the servo pattern frequency. Because the clocks are generated with analog phase locked loop (PLL) circuits, the phase relationship between the two clocks is an unknown and random value when the clocks are powered on, or when the frequency of either clock is changed. In certain applications, such as self-servo write, and so forth, the ability to determine the relationship between the clocks would provide system benefits.

SUMMARY

Systems and methods for performing cross clock phase and/or magnitude measurement are disclosed. In one or more embodiments, the systems and methods are implemented as a clock phase measurement circuit in a data processing apparatus such as a read channel, or the like. The clock phase measurement circuit comprises a selector circuit operable to inject one of a first analog clock signal or a second analog clock signal into a signal path configured to carry an analog data signal, so that the injected analog clock signal replaces the data signal. An Analog to Digital Converter (ADC) converts the injected analog clock signal to a digital clock signal. A counter selects a time, using at least one of the first analog clock signal or the second analog clock signal, to determine at least one of a phase or a magnitude of the digital clock signal. A measurement circuit determines at least one of the phase or the magnitude of the digital clock signal for at least one frequency at the selected time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference number in different instances in the description and the figures indicate similar or identical items.

WRITTEN DESCRIPTION

FIGS. 1 through 4 illustrate a data processing apparatus (a read channel digital front end is shown by way of example) that employs a cross clock phase measurement circuit in accordance with an embodiment of the disclosure. The cross clock phase measurement circuit allows the phase and/or magnitude relationship between two read channel clocks, the "Data clock" and the "Servo clock" to be determined. In embodiments, the clock phase measurement circuit 112 is configured for use in applications that employ phase synchronization between the channel clocks and the media. Example applications include, but are not limited to: Self Servo Write.

Read channels implementing the cross clock phase measurement circuit are applicable to storage of information on virtually any media and/or transmission of information over virtually any channel. Storage applications include, but are not limited to: hard disk drives, compact disks, digital video disks, magnetic tapes and memory devices such as DRAM, NAND flash, NOR flash, other non-volatile memories and solid state drives. In embodiments, the cross clock phase measurement circuit is also applicable in transmission applications. Transmission applications include, but are not limited to: optical fiber, radio frequency channels, wired or wireless local area networks, digital subscriber line technologies, wireless cellular, Ethernet over any medium such as copper or optical fiber, cable channels such as cable television, and Earth-satellite communications.

Figure 1:
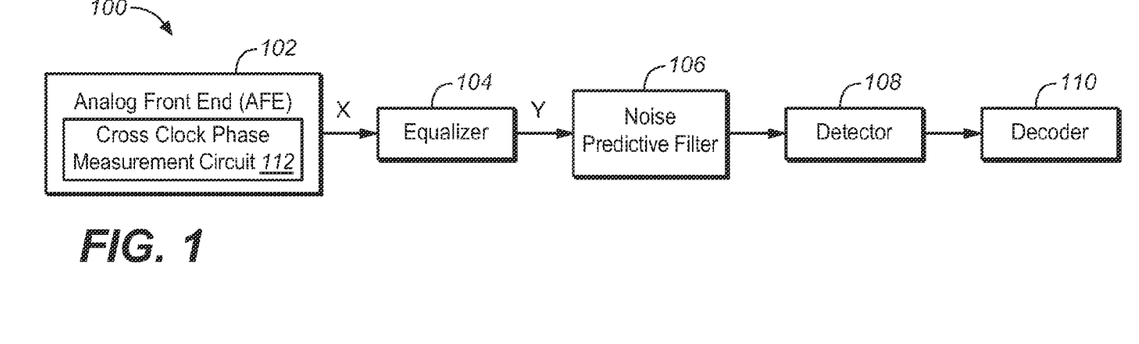
FIG. 1 is a block diagram that illustrates a data processing apparatus, in particular a read channel, that employs cross clock phase measurement circuit in accordance with an embodiment of the disclosure.

As shown in FIG. 1, the read channel 100 includes an analog front end 102 that receives and processes an analog signal from a storage or transmission channel. In embodiments, the analog front end 102 includes, but is not necessarily limited to: an analog filter or an amplifier circuit. For example, in an embodiment, the analog front end 102 includes a high pass filter, a variable gain amplifier (VGA), a compensation circuit for the magneto-resistive asymmetry (MRA) characteristic of a magnetic write head, and so forth. In some embodiments, the gain of a variable gain amplifier and the cutoff frequency and boost of an analog filter included in the analog front end 102 are modifiable.

In various embodiments, the analog signal is derived from a variety of sources. For example, in some embodiments, the analog signal is derived from a read/write head assembly in a storage or transmission channel that is disposed in relation to a storage medium. In other embodiments, the analog signal is derived from a receiver circuit in a storage or transmission channel that is operable to receive a signal from a transmission medium. In various embodiments, the transmission medium is wireless or wired and includes, but is not necessarily limited to: cable or optical connectivity. Other examples are possible.

The analog front end 102 includes Phase-Locked Loop (PLL) circuits that generate synthesized clocks that furnish timing functionality to the read channel 100. In embodiments, the analog front end 102 includes two Phase-Locked Look (PLL) circuits that generate two synthesized clocks, where the frequency of one clock is programmed to match the user data frequency (the "Data clock"), while the frequency of the other clock is programmed to match the servo pattern frequency of the Hard Disk Drive (HDD) (the "Servo clock").

When the ratio of the clock frequencies is programmed so that an integer number of clock cycles of the clocks (e.g., the Data clock and the Servo clock) fit on the once around of a disk of the hard disk drive (See FIG. 6), and when a phase lock is achieved in one clock domain relative to the once around of the disk, the clocks maintain a fixed but unknown phase relationship at any point along the once around of the disk, even when the clocks are at different frequencies. As shown in FIG. 1, the analog front end 102 includes a cross clock phase measurement circuit 112 configured to determine the phase relationship between the synthesized channel clocks (e.g., the Data clock and the Servo clock) of the analog front end 102 using the signal path of the read channel 100 (including the analog front end and the Analog to Digital Converter (ADC)). Embodiments of the cross clock phase measurement circuit 112 are described herein below in the discussion of FIGS. 2, 3, and 4.

Figure 2:
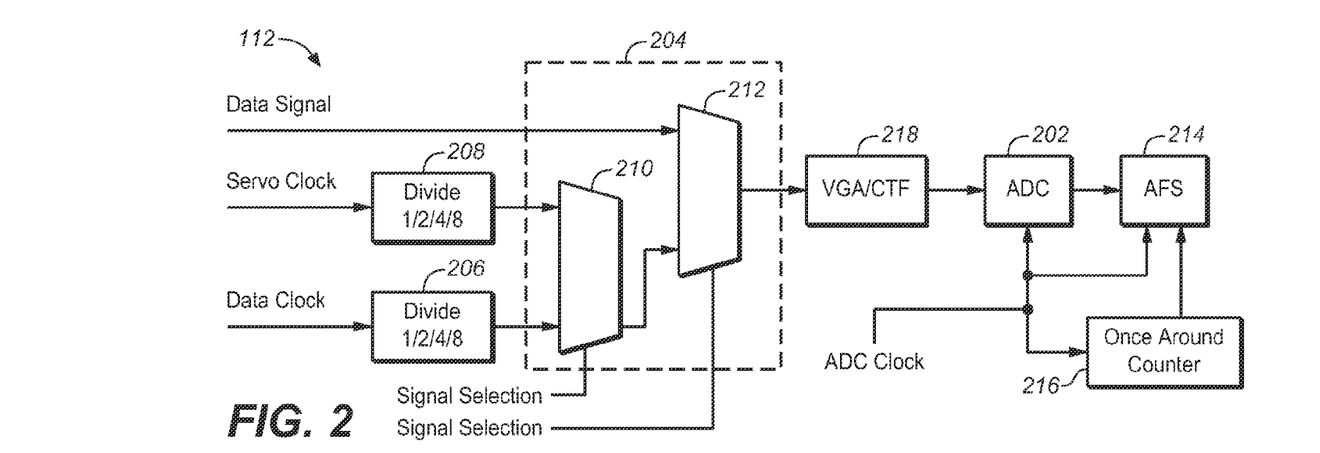
FIG. 2 is a block diagram that illustrates a clock phase measurement circuit of an analog front end of a read channel, such as the read channel shown in FIG. 1, wherein the clock phase measurement circuit employs an Arbitrary Frequency Sensor (AFS) circuit in accordance with an embodiment of the disclosure.
Figure 3:
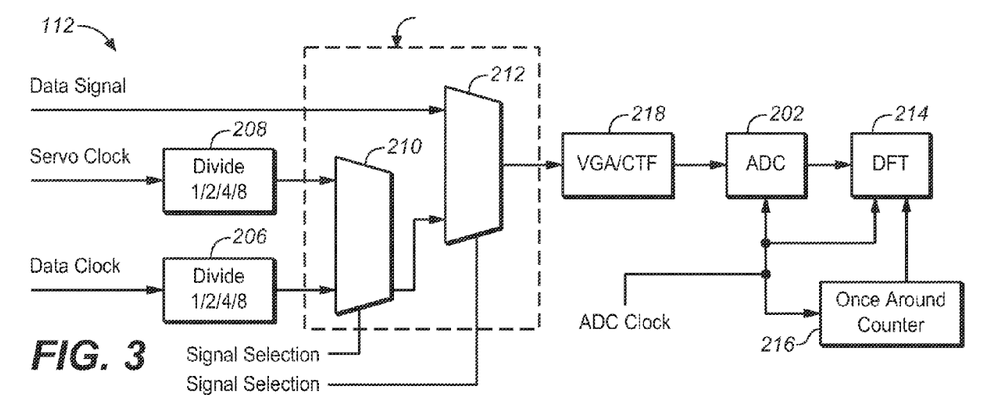
FIG. 3 is a block diagram that illustrates a clock phase measurement circuit of an analog front end of a read channel, such as the read channel shown in FIG. 1, wherein the clock phase measurement circuit employs a Discrete Fourier Transform (DFT) phase and magnitude computation circuit in accordance with an embodiment of the disclosure.
Figure 4:
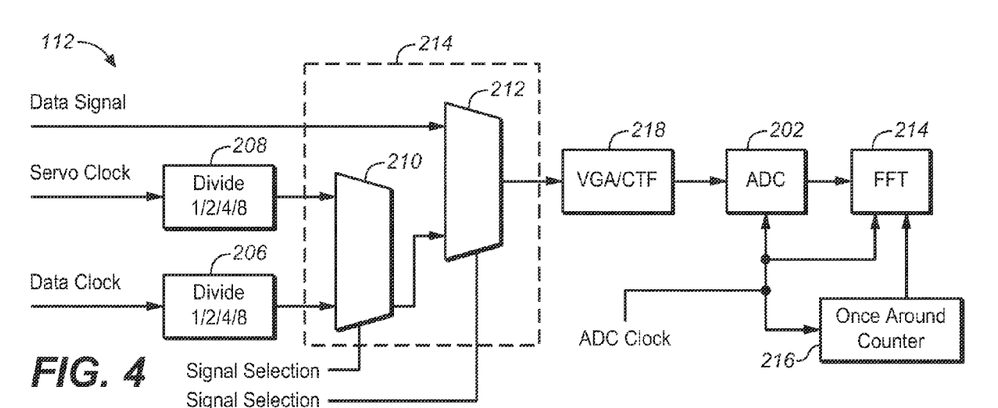
FIG. 4 is a block diagram that illustrates a clock phase measurement circuit of an analog front end of a read channel, such as the read channel shown in FIG. 1, wherein the clock phase measurement circuit employs a Fast Fourier Transform (FFT) phase and magnitude computation circuit in accordance with an embodiment of the disclosure.

The analog front end 102 further includes an Analog to Digital Converter (ADC) (e.g., Analog to Digital Converter (ADC) 202 FIGS. 2, 3, and 4) that converts the processed analog signal into a corresponding series of digital sample data or X samples. In embodiments, the Analog to Digital Converter (ADC) comprises a circuit that is capable of producing digital sample data corresponding to an analog input signal. It will be appreciated that a variety of analog to digital converters (ADCs) are employed by different embodiments of the read channel digital front end. It is further contemplated that, in embodiments, the digital sample data (X samples) is obtained directly from a digital storage device or digital transmission medium, without the use of an Analog to Digital Converter (ADC).

The digital sample data (X samples) is provided to an equalizer 104. The equalizer 104 applies an equalization algorithm to the digital sample data (X samples) to yield equalized sample data or Y samples. In embodiments, the equalizer 104 comprises a digital finite impulse response (DFIR) filter circuit. However, other embodiments are contemplated. In embodiments, the equalized digital sample data (Y samples) is stored in a Y memory or Y buffer (not shown) for processing by the read channel 100 (e.g., the detector 108) as discussed below.

The equalized digital sample data (Y samples) is provided to a noise predictive filter 106. The noise predictive filter 106 is configured to filter noise in the equalized digital sample data (Y samples). The combination of the equalizer (DFIR) 104 and the noise predictive filter (NPFIR) 106 has the effect of channel equalization of the digital sample data (X samples) so that the overall channel is a five (5)-tap signal dependent, partial response channel, which reduces inter-symbol interference (ISI), and suppresses channel noise to improve performance of the detector 108.

The detector 108 is operable to perform an iterative data detection process on the filtered equalized sample data (Y samples). The filtered equalized digital sample data from the noise predictive filter 106 is utilized by the detector 108 for equalizer tap adaptation to determine equalizer coefficients (e.g., DFIR tap coefficients) for the equalizer 104. The detector 108 programs a branch metric (y ideal), a variance, and a scaling factor for equalizer adaptation during a global iteration of the detector as described herein below in the discussion of FIGS. 2 and 3.

In embodiments, the detector 108 comprises a maximum a posteriori (MAP) data detector. However, it is contemplated that, in embodiments, the maximum a posteriori (MAP) data detector employs other maximum a posteriori (MAP) detection algorithms or detector circuits or variations thereof including, but not limited to: simplified maximum a posteriori (MAP) data detection algorithms and max-log maximum a posteriori (MAP) data detection algorithms, or corresponding detector circuits. In other embodiments, the detector 108 comprises a Viterbi algorithm data detector circuit, such as a Soft-Output Viterbi (SOVA) algorithm data detector circuit. However, it is contemplated that, in embodiments, the Viterbi algorithm data detector circuit comprises a Viterbi detection algorithm or Viterbi algorithm detector circuit or variations thereof including, but not limited to: bi-direction Viterbi detection algorithms or bi-direction Viterbi algorithm detector circuits.

Upon completion, the detector 108 provides detected output. The detected output includes soft data. Herein, the term "soft data" is used in its broadest sense to mean reliability data with each occurrence of the reliability data indicating likelihood that a corresponding bit position or group of bit positions has been correctly detected. In some embodiments, the soft data or reliability data comprise log likelihood ratio data. The detected output is provided to a decoder 110 for decoding. The decoder 120 applies a data decode algorithm to the detected output. In embodiments, the decoder 120 comprises any type of decoder circuit including binary and no-binary, layered and non-layered. In embodiments, the decoder 110 comprises a low density parity check (LDPC) decoder circuit. In some embodiments, the detected output is also interleaved in a local interleaver circuit (not shown) to shuffle sub-portions (i.e., local chunks) of the data set included as detector output, and stored in a central memory (not shown).

FIGS. 2, 3, and 4 illustrate embodiments of the cross clock phase measurement circuit 112 shown in FIG. 1. As shown, the cross phase measurement circuit 112 includes an Analog to Digital Converter (ADC) 202. In embodiments, the cross clock phase measurement circuit 112 employs the signal path Analog to Digital Converter (ADC) 202 of the analog front end 102 of the read channel 100 shown in FIG. 1. However, it is contemplated that, in embodiments, the cross phase measurement circuit 112 can also employ a second analog to digital converter (ADC).

The cross clock phase measurement circuit 112 includes a selector circuit 204 that receives the analog clock signals, for example, the Data Clock signal and the Servo Clock signal, as well as the normal analog signal (the "Data Signal") of the signal path, such as the signal path of the analog front end 102 of the read channel 100 shown in FIG. 1. In embodiments, dividers (Divide 1/2/4/8) 206, 208 divide the analog clock signals (Data Clock signal and Servo Clock signal), so that the selector circuit 204 receives divided versions of the signals. The selector circuit 204 injects a selected one of the analog clock signals, either the Data Clock signal or the Servo Clock signal, which in embodiments are divided, onto the signal path, so that the injected analog clock signal replaces the Data Signal. In embodiments, the selector circuit 204 comprises one or more multiplexers (two (2) multiplexers 210, 212 are illustrated). For example, in the embodiment shown, the selector circuit 204 includes a first multiplexor 210 that selects one of the Data Cock signal or the Servo Clock signal, which in embodiments are divided, and furnishes an output. The selector circuit 204 further includes a second multiplexer 212 that selects one of the output of the first multiplexer 210 or the normal Data signal and injects the selected signal onto the signal path. A signal (Signal Selection) is furnished to the multiplexers 210, 212 to control selection between the analog normal signal and one of the analog clock signals (e.g., between the Data signal, the Data Clock signal, or the Servo Clock signal).

The output of the selector circuit (the Data signal, the divided Data Clock signal, or the divided Servo Clock signal) is then sampled by the Analog to Digital Converter (ADC) 202, which converts the signal to a digital signal. Thus, when the selector circuit 204 injects one of the analog clock signals, such as the Data Clock signal or the Servo Clock signal onto the signal path, the Analog to Digital Converter (ADC) samples the injected analog clock signal, and converts the analog clock signal to a digital clock signal.

A measurement circuit 214 receives the digital clock signal and determines at least one of the phase or the magnitude of the digital clock signal for at least one frequency at a selected time. In embodiments, the measurement circuit 214 comprises a single tone measurement circuit since measurement of the phase and or magnitude of the digital clock signal can be accomplished using a single frequency bin. For example, as shown in FIG. 2, the measurement circuit 214 comprises an Arbitrary Frequency Sensor (AFS) circuit configured to determine at least one of the phase and/or the magnitude of the digital clock signal for a selected frequency. In embodiments, the Arbitrary Frequency Sensor (AFS) circuit is configured to compute any one frequency bin of a discrete Fourier transform (DFT) phase and magnitude computation circuit; both magnitude and phase. However, in other embodiments, the measurement circuit 214 comprises a multiple tone measurement circuit, which is configured to determine at least one of the phase and/or the magnitude of the digital clock signal for a plurality of frequencies. For example, in the embodiment shown in FIG. 3, the measurement circuit 214 comprises a full discrete Fourier transform phase and magnitude computation circuit, while in the embodiment shown in FIG. 4, the measurement circuit comprises a fast Fourier transform phase and magnitude computation circuit.

In order to determine the phase of the analog clocks (the Data Clock and the Servo Clock) at any given time on the once around revolution of the disk of the hard disk drive, the cross clock phase measurement circuit 112 includes a counter (Once Around Counter 216) that selects a time, using the ADC Clock signal, to determine at least one of a phase or a magnitude of the digital clock signal. The Counter 216 triggers a point in time for which the measurement circuit 214 (e.g., the Arbitrary Frequency Sensor (AFS) circuit) performs a measurement. In this manner, any point on the once around of the disk, for which it is desirable to determine the relative phase relationship of the clocks (the Data Clock and the Servo Clock) can be selected, even when the clocks are operating at different frequencies. In embodiments, the ADC Clock signal comprises the Data Clock signal. In other embodiments, the ADC Clock signal comprises the Servo Clock signal. In further embodiments, the ADC Clock signal comprises the output of a clock selector circuit, such as a multiplexor, that receives the Data Clock signal and the Servo Clock signal as inputs, to facilitate selection of either the Data Clock signal or the Servo Clock signal by a user.

In embodiments, the Clock signal (the Data Clock signal or the Servo Clock signal) that is injected into the signal path by the selector circuit 204 in place of the normal Data signal can initially be a square wave with large odd harmonics that can degrade the quality of the measurement made by the measurement circuit 214 if not suppressed. Thus, in the embodiments shown in FIGS. 2, 3 and 4, the cross clock phase measurement circuit 112 includes a filter 218 such as a Variable Gain Amplifier (VGA or Continuous Time Filter (CTF) that is configured to supply adequate low pass/anti-aliasing filtering before the Clock signal is sampled in the Analog to Digital Converter (ADC).

As shown in FIGS. 2, 3 and 4, to determine the phase relationship between the clocks (between the Data clock and the Servo clock), the selector circuit 204 inserts (e.g., "muxes") a divided (via divider 208) version of the Servo Clock signal into the signal path in place of the normal Data signal. The measurement circuit 214 uses the Data Clock signal to sample the Servo Clock signal, and perform a phase measurement of the Servo Clock signal to detect the phase of the signal. In the embodiment shown in FIG. 2, the Arbitrary Frequency Sensor (AFS) circuit performs a single frequency phase measurement for a selected frequency. In embodiments, the Arbitrary Frequency Sensor (AFS) circuit is configured to allow selection of a frequency to be measured. Thus, in such embodiments, the Arbitrary Frequency Sensor (AFS) is configured (by the user) to measure the phase of a single frequency tone matching the frequency of the Servo Clock.

In embodiments, the selector circuit 204 is further capable of inserting (e.g., "muxing") a divided (via divider 206) version of the Data Clock signal into the signal path in place of the normal Data signal. The measurement circuit 214 thus uses the Data Clock signal to sample the Data Clock signal, and perform a phase measurement of the Servo Clock signal. Even though the Data Clock is used to measure the phase of the Data Clock signal, this configuration is used to help calibrate any fixed delays through the read channel 100 when determining the actual phase of the Data Clock signal.

Figure 5:
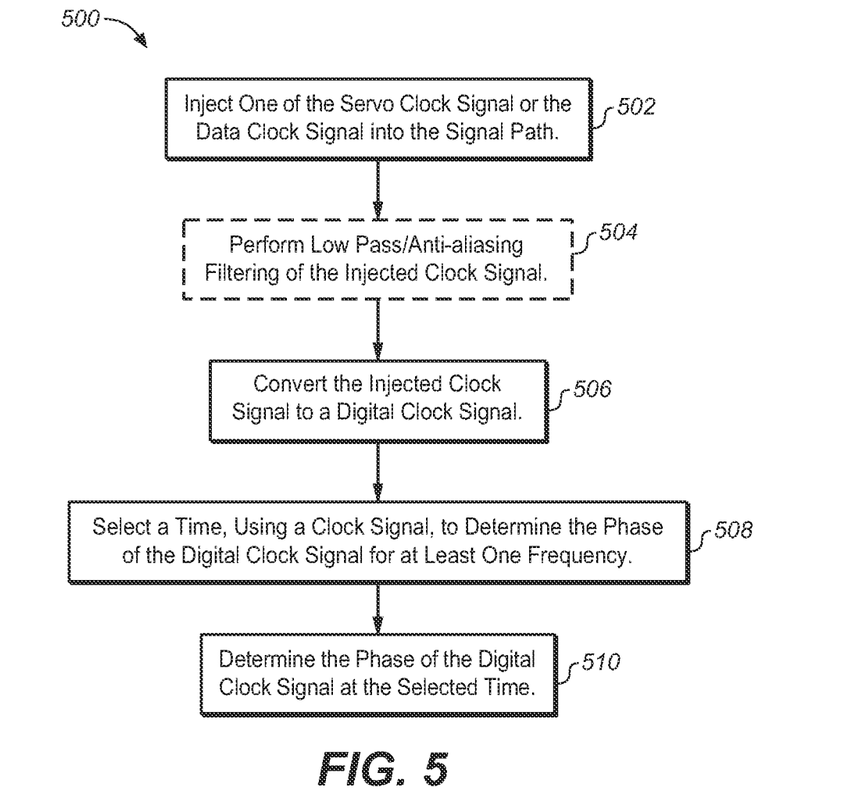
FIG. 5 is a flow diagram that illustrates a method that that are implemented by a data processing apparatus, such as a read channel, to furnish cross clock phase measurement in accordance with an embodiment of the disclosure.

FIG. 5 illustrates a procedure (e.g., method, process, etc.) 500 in an embodiment of the disclosure that is employed by an cross clock phase measurement circuit, such as the cross clock phase measurement circuit 112 of the analog front end 102 the read channel 100 shown in FIG. 1, to determine the phase and/or magnitude relationship between read channel clocks, the "Data clock" and the "Servo clock." As shown, one of the Servo clock signal or the Data clock signal are injected (inserted) into the signal path (Block 402) configured to carry an analog data signal in the Analog Front End (AFE) of a read channel. The injected Clock signal replaces the Data signal on the signal path. For example, in the embodiment shown in FIGS. 2, 3 and 4, the selector circuit 204 of the cross clock phase measurement circuit 112 inserts (e.g., "muxes") a divided (via divider 208) version of the Servo Clock signal into the signal path in place of the normal Data signal.

As noted, the Clock signal (the Data Clock signal or the Servo Clock signal) that is injected into the signal path by the selector circuit 204 in place of the normal Data signal can initially be a square wave with large odd harmonics that can degrade the quality of the measurement made by the measurement circuit 214 if not suppressed. Thus, in embodiments, low pass/anti-aliasing filtering is performed on the injected Clock signal (Block 504). For example, as shown in FIGS. 2, 3 and 4, the cross clock phase measurement circuit 112 includes a filter 218 such as a Variable Gain Amplifier (VGA or Continuous Time Filter (CTF) that is configured to supply adequate low pass/anti-aliasing filtering before the Clock signal is sampled in the Analog to Digital Converter (ADC).

The injected Clock signal is converted to a digital Clock signal (Block 506). For example, as shown in FIGS. 2, 3, and 4, the output of the selector circuit (the Data signal, the divided Data Clock signal, or the divided Servo Clock signal) is sampled by the Analog to Digital Converter (ADC) 202, which converts the signal to a digital signal. Thus, when the selector circuit 204 injects one of the analog clock signals, such as the Data Clock signal or the Servo Clock signal onto the signal path, the Analog to Digital Converter (ADC) samples the injected analog clock signal, and converts the analog clock signal to a digital clock signal.

A time is selected, using a clock signal, which may comprise at least one of the first analog clock signal or the second analog clock signal, to determine the phase of the digital clock signal for at least one frequency (Block 508). For example, as shown in FIGS. 2, 3, and 4, the cross clock phase measurement circuit 112 illustrated includes a counter (Once Around Counter 216) that triggers a point in time for which the measurement circuit 214 (e.g., the Arbitrary Frequency Sensor (AFS) circuit) performs a measurement.

The phase of the digital clock signal is then determined at the selected time (Block 510). For example, the measurement circuit 214 shown in FIGS. 2, 3, and 4, receives the digital Clock signal and determines at least one of the phase or the magnitude of the digital clock signal for at least one frequency at a selected time. In embodiments, the measurement circuit 214 comprises a single tone measurement circuit such as an Arbitrary Frequency Sensor (AFS) circuit configured to determine at least one of the phase and/or the magnitude of the digital clock signal for a selected frequency. In other embodiments, the measurement circuit 214 comprises a multiple tone measurement circuit, which is configured to determine at least one of the phase and/or the magnitude of the digital clock signal for a plurality of frequencies. For example, in the embodiment shown in FIG. 3, the measurement circuit 214 comprises a full discrete Fourier transform phase and magnitude computation circuit, while in the embodiment shown in FIG. 4, the measurement circuit comprises a fast Fourier transform phase and magnitude computation circuit.

Figure 6:
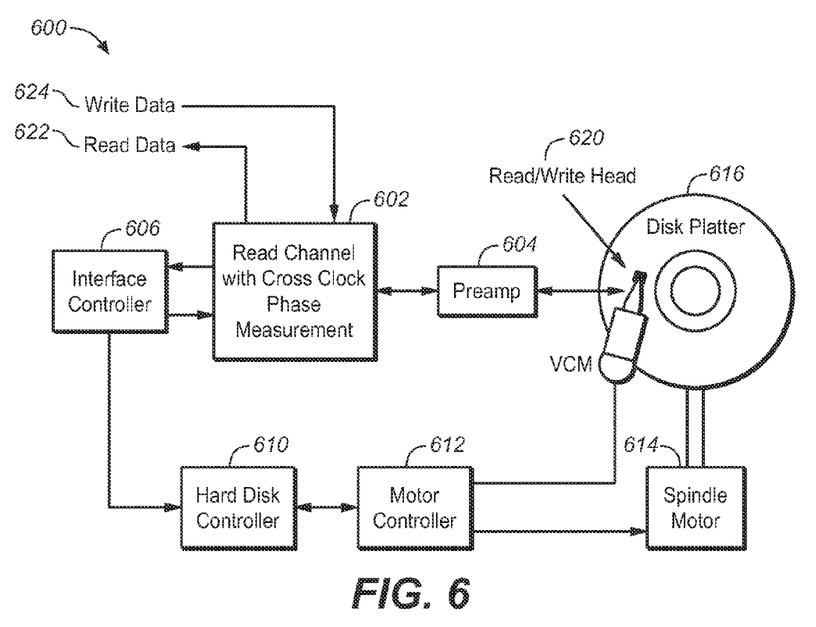
FIG. 6 is a block diagram that illustrates a storage system having a read channel that employs a cross clock phase measurement circuit in accordance with an embodiment of the disclosure.
Figure 7:
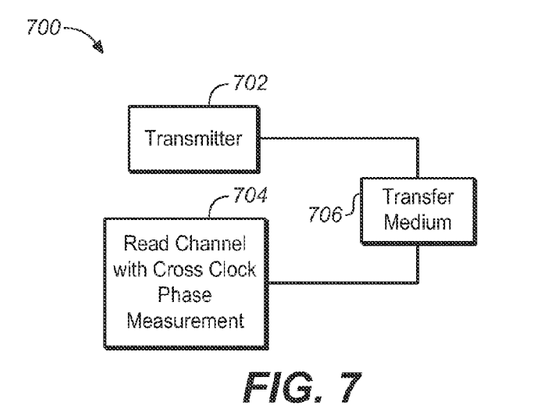
FIG. 7 is a block diagram that illustrates a wireless communication system having a receiver that employs a cross clock phase measurement circuit in accordance with an embodiment of the disclosure.

Although the data-dependent equalizer circuit disclosed herein is not limited to any particular application, several examples of applications are presented in FIGS. 6 and 7. In FIG. 6, a storage system 600 is illustrated. The storage system 600 includes a read channel circuit 602 that employs a cross clock phase measurement circuit, such as the circuit shown in FIGS. 1 through 4. In embodiments, the storage system 600 is, for example, a hard disk drive (HDD). As shown, the storage system 600 includes a preamplifier 604, an interface controller 606, a hard disk controller 610, a motor controller 612, a spindle motor 614, a disk platter 616, and a read/write head assembly 620. The interface controller 606 controls addressing and timing of data to/from the disk platter 616. The data on the disk platter 616 includes groups of magnetic signals that are detected by the read/write head assembly 620 when the assembly is properly positioned over disk platter 616. In one or more embodiments, the disk platter 616 includes magnetic signals recorded in accordance with either a longitudinal or a perpendicular recording scheme.

In a typical read operation, the read/write head assembly 620 is accurately positioned by the motor controller 612 over a desired data track on the disk platter 616. The motor controller 612 positions the read/write head assembly 620 in relation to the disk platter 616 and drives the spindle motor 614 by moving the read/write head assembly 620 to the proper data track on the disk platter 616 under the direction of the hard disk controller 610. The spindle motor 614 spins the disk platter 616 at a determined spin rate (e.g., at a determined number of revolutions per minute (RPM)). Once the read/write head assembly 620 is positioned adjacent to the proper data track, magnetic signals representing data on the disk platter 616 are sensed by the read/write head assembly 620 as the disk platter 616 is rotated by the spindle motor 614. The sensed magnetic signals are provided as a continuous, minute analog signal representative of the magnetic data on the disk platter 616. This minute analog signal is transferred from the read/write head assembly 620 to the read channel circuit 602 via a preamplifier 604. The preamplifier 604 is operable to amplify the minute analog signals accessed from the disk platter 616. In turn, the read channel 602 decodes and digitizes the received analog signal to recreate the information originally written to the disk platter 616. This data is provided as read data 622 to a receiving circuit. As part of decoding the received information, the read channel 602 processes the received signal using the data-dependent equalizer circuit 102 as described herein. A write operation is substantially the opposite of the preceding read operation with write data 624 being provided to the read channel 602. This data is then encoded and written to the disk platter 616.

It should be noted that, in embodiments, the storage system 600 is integrated into a larger storage system such as, for example, a RAID (redundant array of inexpensive disks or redundant array of independent disks) based storage system. RAID storage systems increase stability and reliability through redundancy, combining multiple disks as a logical unit. In this manner, data is spread across a number of disks included in the RAID storage system according to a variety of algorithms and accessed by an operating system as if the RAID storage system were a single disk drive. For example, in embodiments, data is mirrored to multiple disks in the RAID storage system, or is sliced and distributed across multiple disks using a number of techniques. If a small number of disks in the RAID storage system fail or become unavailable, error correction techniques are used to recreate the missing data based on the remaining portions of the data from the other disks in the RAID storage system. In embodiments, the disks in the RAID storage system include, but are not limited to: individual storage systems such as storage system 600, and are located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk drive.

FIG. 7 illustrates a wireless communication system 700 or data transmission device including a receiver 704 that employs a cross clock phase measurement circuit, such as the circuit shown in FIGS. 1 through 4. The communication system 700 includes a transmitter 702 that is operable to transmit encoded information via a transfer medium 706. The encoded data is received from the transfer medium 706 by a receiver 704. In embodiments, the receiver 704 is fabricated in various ways including, but not limited to, being fabricated as a stand-alone receiver or as part of a transceiver.

Generally, any of the functions described herein can be implemented using hardware (e.g., fixed logic circuitry such as integrated circuits), software, firmware, manual processing, or a combination of these embodiments. Thus, the blocks discussed in the above disclosure generally represent hardware (e.g., fixed logic circuitry such as integrated circuits), software, firmware, or a combination thereof. In the case of a hardware embodiment, for example, the various blocks discussed in the above disclosure can be implemented as integrated circuits along with other functionality. In embodiments, such integrated circuits include all of the functions of a given block, system or circuit, or a portion of the functions of the block, system or circuit. Further, in embodiments, elements of the blocks, systems or circuits are implemented across multiple integrated circuits. Such integrated circuits include any type of integrated circuit including, but not necessarily limited to: a monolithic integrated circuit, a flip chip integrated circuit, a multichip module integrated circuit, and/or a mixed signal integrated circuit. In the case of a software embodiment, for example, the various blocks discussed in the above disclosure represent executable instructions (e.g., program code) that perform specified tasks when executed on a processor. In embodiments, these executable instructions are stored in one or more tangible computer readable media. In some such embodiments, the entire system, block or circuit is implemented using its software or firmware equivalent. In other embodiments, one part of a given system, block or circuit is implemented in software or firmware, while other parts are implemented in hardware.

Although the subject matter has been described in language specific to structural features and/or methodological acts, it is to be understood that the subject matter defined in the appended claims is not necessarily limited to the specific features or acts described. Although various configurations are discussed, the apparatus, systems, subsystems, components and so forth can be constructed in a variety of ways without departing from this disclosure. Rather, the specific features and acts are disclosed as example forms of implementing the claims.

What is claimed is:

1. A data processing apparatus, comprising:
a signal path configured to carry an analog data signal;
a selector circuit operable to inject one of a first analog clock signal or a second analog clock signal into the signal path, the selector circuit configured to replace the data signal with the injected one of the first analog clock signal or the second analog clock signal on the signal path;
an analog to digital converter configured to convert the injected one of the first analog clock signal or the second analog clock signal to a digital clock signal;
a counter configured to select a time, using at least one of the first analog clock signal or the second analog clock signal, to determine at least one of a phase or a magnitude of the digital clock signal; and
a measurement circuit configured to determine at least one of the phase or the magnitude of the digital clock signal for at least one frequency at the selected time.

2. The data processing apparatus as recited in claim 1, wherein selector circuit comprises a multiplexor.

3. The data processing apparatus as recited in claim 1, wherein the first analog clock signal comprises a servo clock signal and the second analog clock signal comprises a data clock signal of an analog front end of a read channel.

4. The data processing apparatus as recited in claim 3, wherein the counter comprises a once around counter, and the selected time comprises a time during a once around revolution of a disk of a hard disk drive.

5. The data processing apparatus as recited in claim 1, wherein the measurement circuit comprises an arbitrary frequency sensor circuit configured to determine at least one of the phase or the magnitude of the digital clock signal for a selected frequency.

6. The data processing apparatus as recited in claim 1, wherein the measurement circuit comprises a discrete Fourier transform phase and magnitude computation circuit configured to determine at least one of the phase or the magnitude of the digital clock signal for a plurality of frequencies.

7. The data processing apparatus as recited in claim 1, wherein the measurement circuit comprises a fast Fourier transform phase and magnitude computation circuit configured to determine at least one of the phase or the magnitude of the digital clock signal for a plurality of frequencies.

8. The data processing apparatus as recited in claim 1, further comprising a continuous time filter configured to furnish low pass anti-aliasing filtering of the injected one of the first analog clock signal or the second analog clock signal.

9. The data processing apparatus as recited in claim 1, wherein the data processing apparatus is fabricated in an integrated circuit.

10. A method comprising:
injecting one of a first analog clock signal or a second analog clock signal into a signal path configured to carry an analog data signal, the injected one of the first analog clock signal or the second analog clock signal replacing the data signal on the signal path;
converting the injected one of the first analog clock signal or the second analog clock signal to a digital clock signal;
selecting a time, using at least one of the first analog clock signal or the second analog clock signal, to determine the phase of the digital clock signal for at least one frequency; and
determining the phase of the digital clock signal at the selected time.

11. The method as recited in claim 10, wherein the first analog clock signal comprises a servo clock signal and the second analog clock signal comprises a data clock signal of an analog front end of a read channel.

12. The method as recited in claim 11, wherein the selected time comprises a time during a once around revolution of a disk of a hard disk drive.

13. The method as recited in claim 10, further comprising performing low pass anti-aliasing filtering of the injected one of the first analog clock signal or the second analog clock signal.

14. A storage system, comprising:
a storage medium configured to maintain a data set;
a read/write assembly operable to read the data set on the storage medium; and
a read channel, comprising:
a signal path configured to carry an analog data signal;
a selector circuit operable to inject one of a first analog clock signal or a second analog clock signal into the signal path, the selector circuit configured to replace the data signal with the injected one of the first analog clock signal or the second analog clock signal on the signal path;
an analog to digital converter configured to convert the injected one of the first analog clock signal or the second analog clock signal to a digital clock signal;

a counter configured to select a time, using at least one of the first analog clock signal or the second analog clock signal, to determine at least one of a phase or a magnitude of the digital clock signal; and a measurement circuit configured to determine at least one of the phase or a magnitude of the digital clock signal for at least one frequency at the selected time.

15. The storage system as recited in claim 14, wherein selector circuit comprises a multiplexor.

16. The storage system as recited in claim 14, wherein the read channel comprises an analog front end; and wherein the first analog clock signal comprises a servo clock signal and the second analog clock signal comprises a data clock signal of the analog front end.

17. The storage system as recited in claim 16, wherein the storage medium comprises a hard disk drive comprising a disk; and wherein the counter comprises a once around counter, and the selected time comprises a time during a once around revolution of the disk.

18. The storage system as recited in claim 14, wherein the measurement circuit comprises an arbitrary frequency sensor circuit configured to determine at least one of the phase or the magnitude of the digital clock signal for a selected frequency.

19. The storage system as recited in claim 14, wherein the measurement circuit comprises at least one of a discrete Fourier transform phase and magnitude computation circuit or a fast Fourier transform phase and magnitude computation circuit configured to determine at least one of the phase or the magnitude of the digital clock signal for a plurality of frequencies.

20. The storage system as recited in claim 14, wherein the read channel further comprises a continuous time filter configured to furnish low pass anti-aliasing filtering of the injected one of the first analog clock signal or the second analog clock signal.

* * * * *